May 24, 1966  J. H. HUNTLEY  3,252,739
WHEEL COVER
Filed July 10, 1964 2 Sheets-Sheet 1
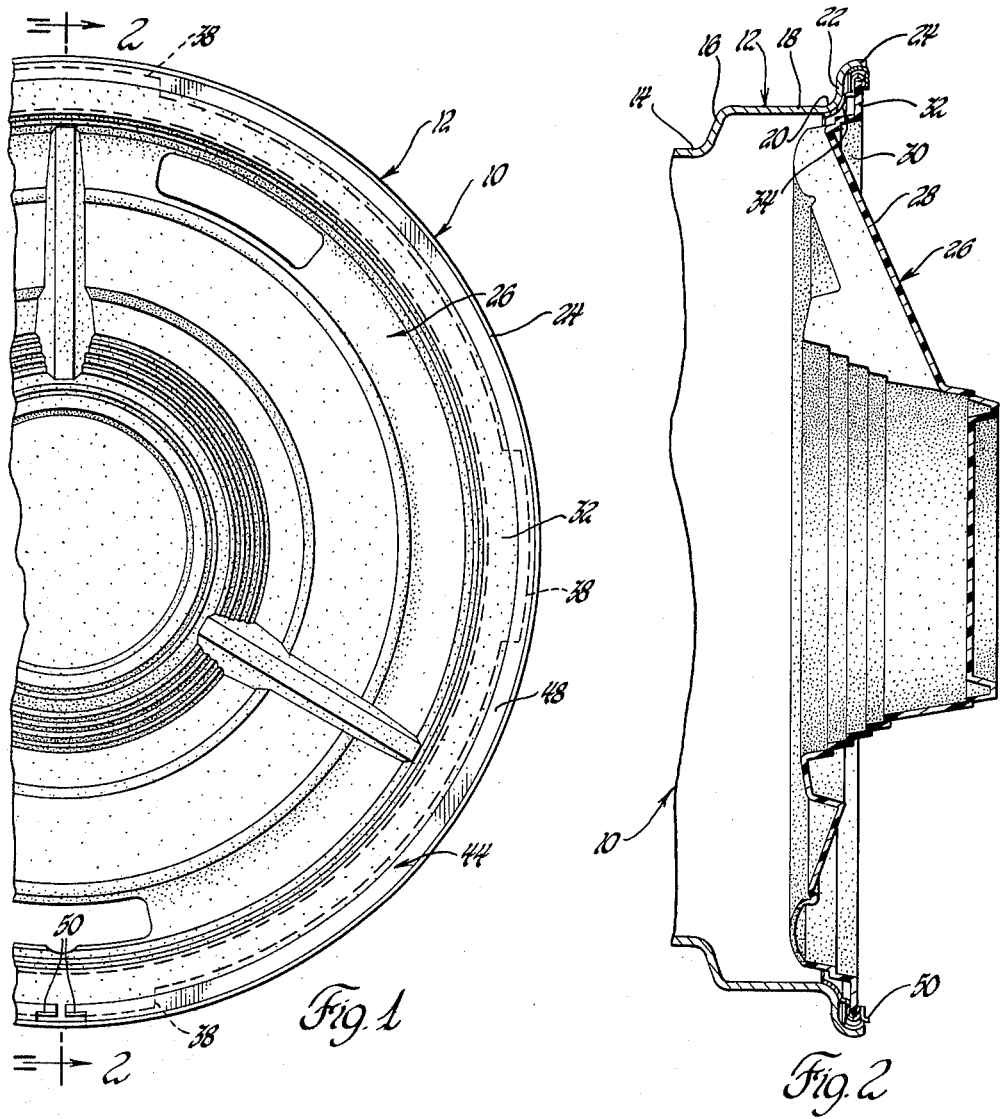
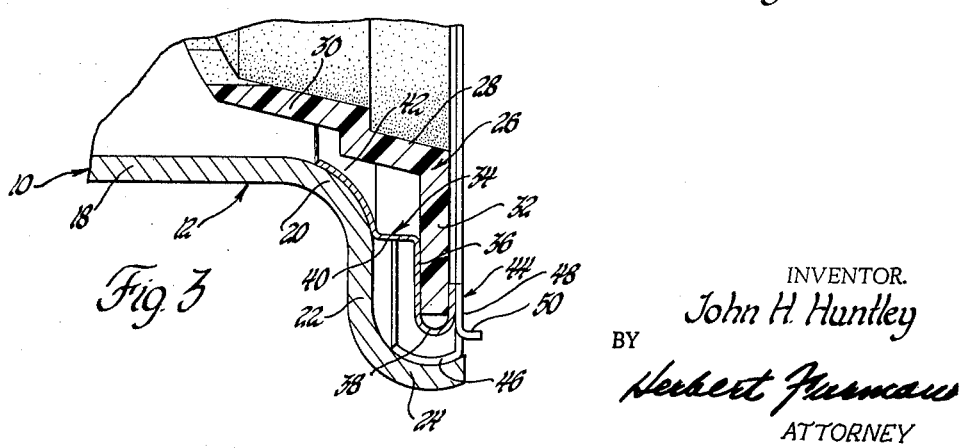
INVENTOR.
John H. Huntley
BY
Herbert Furman
ATTORNEY May 24, 1966  J. H. HUNTLEY  3,252,739
WHEEL COVER
Filed July 10, 1964  2 Sheets-Sheet 2
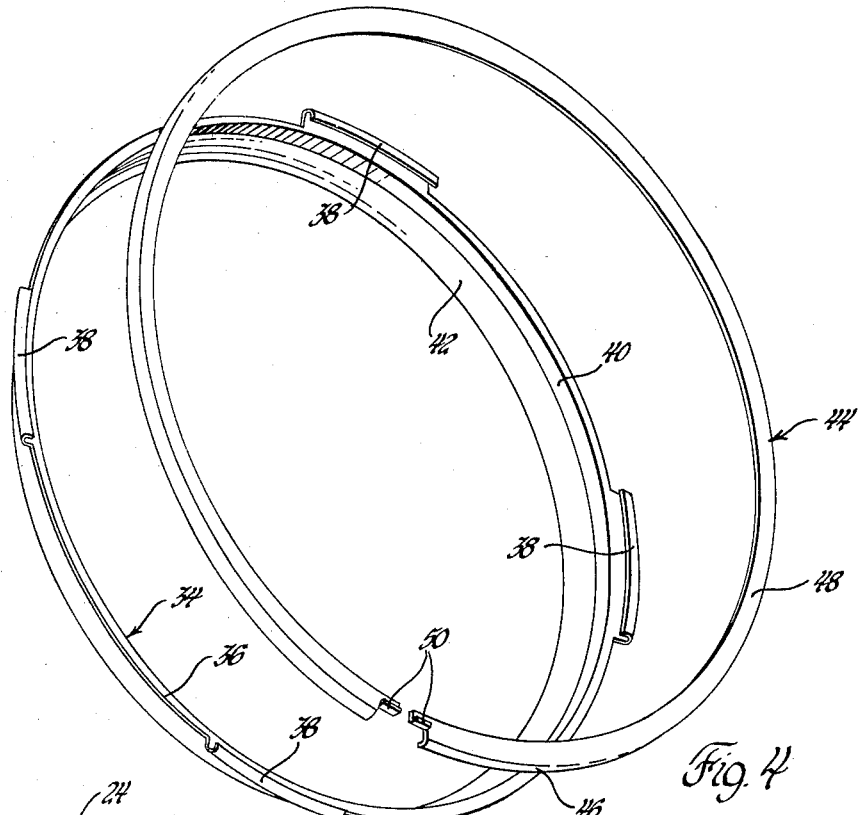
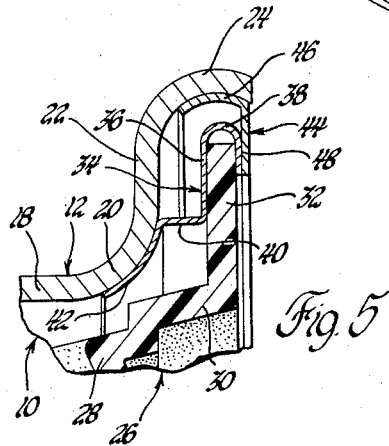
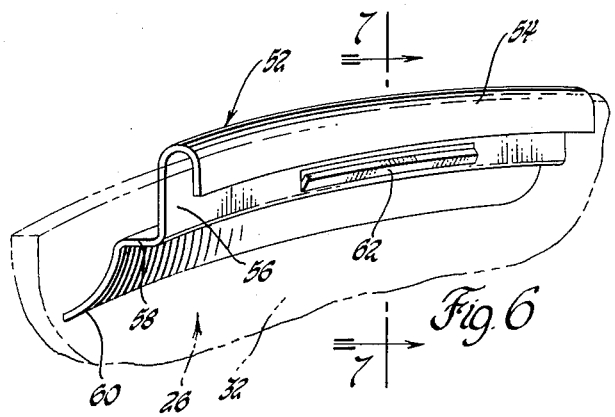
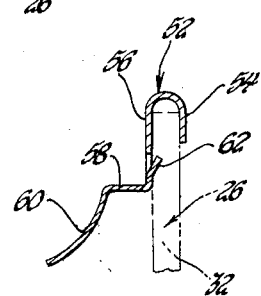
INVENTOR.
John H. Huntley
BY
Herbert Furman
ATTORNEY

United States Patent Office 3,252,739
Patented May 24, 1966

3,252,739
WHEEL COVER
John H. Huntley, Detroit, Mich., assignor to General Motors Corporation, Detroit, Mich., a corporation of Delaware
Filed July 10, 1964, Ser. No. 381,698
4 Claims. (Cl. 301—37)

This invention relates to wheel covers and more particularly to wheel covers having improved retaining means for mounting the cover on a portion of the vehicle wheel.

One feature of this invention is that it provides a wheel cover including a cover body having a peripheral or marginal portion which is located both radially and axially of the terminal area of a wheel rim and is secured in place on the rim. Another features of this invention is that the cover body may be made of plastic or other light weight material. A further feature of this invention is that a plurality of resilient spring finger means are adapted to be secured to the marginal portion of the cover body and to be engageable with an annular shoulder of the wheel rim to locate the cover body. Yet another feature of this invention is that the spring finger means form part of an annular band secured to the marginal portion of the cover body, and the retaining means includes an annular band engageable with the annular band of the spring finger means and with the terminal portion of the wheel rim to locate the spring finger means band and the cover body within the opening of the wheel.

These and other features and advantages of the wheel cover of this invention will be readily apparent from the following specification and drawings wherein:

FIGURE 1 is a partial elevational view of a wheel cover according to this invention mounted on a vehicle wheel;

FIGURE 2 is a sectional view taken generally along the plane indicated by line 2—2 of FIGURE 1;

FIGURE 3 is an enlarged view of a portion of FIGURE 2;

FIGURE 4 is an exploded perspective view of both annular bands;

FIGURE 5 is an enlarged view of a portion of FIGURE 2;

FIGURE 6 is a perspective view of a modified form of the invention; and

FIGURE 7 is an enlarged sectional view taken generally along the plane indicated by line 7—7 of FIGURE 6.

Referring now to FIGURES 1 through 5 of the drawings, a vehicle wheel designated generally 10 is of conventional structure and includes a wheel body, not shown, and a wheel rim 12. The rim 12 includes an annular base flange 14 which merges on an annular juncture or rib with an annular radially and axially facing flange 16 which in turn merges on an annular juncture or rib with a generally axially extending radially facing intermediate flange 18. Flange 18 merges on an arcuate juncture or shoulder 20 with a generally radially extending, axially facing flange 22 which merges into an arcuately shaped terminal flange or lip 24.

The wheel cover assembly designated generally 26 includes a cover body or member 28 which is preferably formed of plastic, as shown, and provided with a generally axially extending radially facing flange or portion 30 adapted to be juxtaposed to shoulder 20 and merging into a generally radially extending axially facing marginal or peripheral flange or portion 32 which is adapted to be juxtaposed to the flange portion 22 and to be located within the confines of the lip 24, as shown in FIGURES 2, 3 and 5. An annular ring or band 34 includes an outer radially extending flange 36 having extending therefrom at four equally spaced locations, a plurality of radially inwardly opening spring fingers or return bent clamping portions 38. Preferably the band 34 is continuous, and the band can be assembled to the cover body by forming the fingers 38 in the flat, fitting the marginal portion of the cover within the fingers 38, with the inner surface of the flange 32 in engagement with the flange 36 of the band, and then bending the fingers over the cover body. If desired, band 34 may be made split and the fingers 38 completely formed prior to the assembly of the band and the cover body.

Band 34 further includes a continuous axially extending intermediate flange 40 which extends laterally to the flange 36 and joins to a generally arcuately shaped annular flange or portion 42 which is shaped complementary to the shoulder 20 of the wheel rim and seats thereagainst.

When the assembled annular band 34 and cover body 28 are inserted within the opening of the wheel, the engagement of the flange 42 of the band with the annular shoulder 20 of the wheel rim locates the cover body both axially and radially within the opening of the wheel and more specifically locates the flange 32 of the cover body with respect to the flange 22 and lip 24 of the wheel rim as well as locating the flange 30 of the cover body with respect to the shoulder 20.

The assembled band and cover body are held in place on the wheel rim by an annular split ring or band 44 having a laterally extending flange or portion 46 which is complementary to the inner surface of the lip 24 and resiliently engageable therewith when the band 44 is mounted on the wheel with the flange 48 thereof in engagement with the spring fingers 38, as shown in FIGURES 3 and 5.

At the split in the band 44, portions of the flange 46 are cut away and portions of the flange 48 are bent laterally to form pry-off tabs 50. When it is desired to remove the band 44, a screw driver or other similar pry-off tool can be inserted in the space between the tabs 50 and the lip 24 of the wheel rim, as indicated in FIGURE 3, to pry the band 44 from the wheel and permit removal of the cover body 28 and band 34.

FIGURES 6 and 7 show a modification wherein the band 34 is not continuous but is rather divided up into four separate fingers or portions, each of which is designated generally 52, and includes a radially inwardly opening finger portion or clamping portion 54 corresponding to the portion 38 of the band 34, and flange portions 56, 58 and 60 corresponding to the flange portions 36, 40 and 42 of the band 34. Tabs 62 are bent inwardly of the flange portion 56 and are engageable with the inner or rear surface of the flange 32 of the cover body 28 upon assembly of the fingers 52 therewith to provide a deterrent to release of the fingers 52 from the cover 28. The assembly of the fingers 52 to the cover body 28 is first accomplished and thereafter the assembled fingers and cover body are mounted on the wheel rim by a band 44 in the same manner as the assembled band 34 and cover body 28 are mounted on the wheel rim.

Thus, this invention provides an improved wheel cover.

What is claimed is:

1. In combination with a vehicle wheel including a generally axially extending flange merging on an arcuate juncture with a generally radially facing flange terminating in a generally arcuately shaped peripheral lip, a wheel cover assembly comprising, a cover body having a marginal portion juxtaposed to said radially facing wheel flange and located within the confines of said lip, an annular member having a radially inwardly opening channel portion receiving and being secured to said cover marginal portion, said annular member including a radially outwardly and axially inwardly opening arcuate flanged portion seating on said wheel juncture when said cover body and annular member are located within said wheel lip, and a second annular member seating against said cover marginal portion and having an arcuate flange snapped within said wheel lip to mount said second annular member on said wheel, said second annular member holding said first annular member flange in engagement with said wheel juncture.

2. The combination recited in claim 1 wherein said first annular member extends the circumferential extent of said cover member and includes a plurality of radially inwardly opening channel portions and a plurality of spaced arcuate flanges for resiliently locating said cover body within said wheel lip.

3. The combination recited in claim 2 wherein said second annular ring seats against the axially outer legs of said annular member channel portions to conceal said legs.

4. The combination recited in claim 1 wherein said second annular member is a split ring so as to be snapped within said wheel lip and includes at least one pry-off shoulder for reception of a pry-off tool engageable against said arcuate lip to pry said ring from said wheel.

References Cited by the Examiner
UNITED STATES PATENTS

| | | | |
|---|---|---|---|
| 2,226,511 | 12/1940 | Hollerith | 201—37 |
| 2,926,953 | 3/1960 | Lyon | 301—37 X |
| 2,998,105 | 8/1961 | Lyon | 301—37 X |

FOREIGN PATENTS

| | | |
|---|---|---|
| 491,457 | 3/1953 | Canada. |
| 494,765 | 7/1953 | Canada. |
| 606,077 | 10/1960 | Canada. |

BENJAMIN HERSH, *Primary Examiner.*

R. J. JOHNSON, *Assistant Examiner.*